(12) United States Patent
Low et al.

(10) Patent No.: US 8,887,182 B2
(45) Date of Patent: Nov. 11, 2014

(54) HYBRID APPLICATIONS

(71) Applicants: Daryl Low, San Jose, CA (US);
Anne-Lise Hassenklover, Redwood City, CA (US)

(72) Inventors: Daryl Low, San Jose, CA (US);
Anne-Lise Hassenklover, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 85 days.

(21) Appl. No.: 13/653,198

(22) Filed: Oct. 16, 2012

(65) Prior Publication Data

US 2014/0109115 A1   Apr. 17, 2014

(51) Int. Cl.
*G06F 3/00* (2006.01)
*G06F 9/54* (2006.01)

(52) U.S. Cl.
CPC ........................................ *G06F 9/54* (2013.01)
USPC .......................................... 719/328; 719/330

(58) Field of Classification Search
CPC .............................. G06F 17/30873; G06F 9/54
USPC .................................................. 719/328, 330
See application file for complete search history.

(56) References Cited

U.S. PATENT DOCUMENTS

2002/0052727 A1* 5/2002 Bond et al. ....................... 703/26
2013/0054843 A1* 2/2013 Jan et al. ........................... 710/16
2014/0025726 A1* 1/2014 Chen ............................. 709/203

OTHER PUBLICATIONS

Andrew M. Phelps, Fun and Game, Feb. 2004.*

* cited by examiner

*Primary Examiner* — Lechi Truong
(74) *Attorney, Agent, or Firm* — Martine Penilla Group, LLP

(57) ABSTRACT

A native application portion is configured for execution in a native environment. A native kernel is defined in the native environment, the native kernel including one or more native plugin services accessible by the native application portion. A non-native application portion is configured for execution in a web view context. A non-native kernel is defined in the web view context, the non-native kernel including one or more non-native plugin services accessible by the non-native application portion. A native kernel bridge service is interfaced with the native kernel, and a non-native kernel bridge service is interfaced with the non-native kernel. The native kernel bridge service and non-native kernel bridge service are interfaced with each other, enabling the non-native application portion to access the native plugin services of the native kernel, and enabling the native application portion to access the non-native plugin services of the non-native kernel.

16 Claims, 4 Drawing Sheets

HYBRID APPLICATIONS

BACKGROUND

1. Field of the Invention

The present invention relates to systems and methods for hybrid applications.

2. Description of the Related Art

Due to differences amongst platforms, mobile application development is often a one-off affair, targeting a single application on a single mobile platform such as Android using Java. When, for example, an iOS version of the application needs to be written in Objective-C, then an entirely new application is developed from scratch, often by a different team of specialized engineers. When this paradigm is perpetuated, the result is an inefficient development model where teams working independently reinvent the same code to solve similar problems.

Hybrid native/web frameworks such as PhoneGap and Appcelerator Titanium tackle this problem by moving platform specific native code into JavaScript (JS) executing in the device's native web view environment. JavaScript running in this environment can tap into reusable native code via remote procedure calls over a JS/native bridge. The goal is to make it easy to port the same application across multiple platforms while amortizing the cost of developing reusable native code over several different projects. Although this approach appears promising in theory, it begins to break-down when an application tries to break from the typical "tables and tabs" user interface while presenting dynamically downloaded/updated rich experiences.

PhoneGap's web-centric approach extends a standard web browser environment with extra APIs for platform specific features such as geolocation, accelerometer, local file access, etc., but lacks standardized access to leverage and coordinate with native UI features. Instead, the user interface and business logic is left entirely to web frameworks such as YUI and JQuery. In this environment, developers are totally at the mercy of the web view's ability to quickly and accurately render and animate CSS3. Depending on the HTML framework, it can be challenging to develop a user experience that does not feel like a web site or work around the visual glitches that the on-screen keyboard or video overlays cause.

In contrast, Titanium uses a native-centric solution that uses the native web view environment only for application control logic. Employing a one-size-fits all abstract UI framework, developers can use native UI elements to make applications that feel less web-like than what PhoneGap has to offer. But the lowest common denominator UI framework also prevents developers from significantly customizing the look & feel of their application. Although the API supports spawning multiple web views for e-book like dynamic content, these web views cannot access any of the Titanium APIs, cutting them off from the advanced native features of Titanium.

It is in this context that embodiments of the invention arise.

SUMMARY

Broadly speaking, embodiments of the present invention provide methods and systems for hybrid applications. Several inventive embodiments are described below.

In one embodiment, a hybrid application defined on a computing device is provided. The hybrid application includes: a native application portion configured for execution in a native environment of the computing device; a native kernel defined in the native environment, the native kernel including one or more native plugin services accessible by the native application portion; a non-native application portion configured for execution in a web view context of the computing device; a non-native kernel defined in the web view context, the non-native kernel including one or more non-native plugin services accessible by the non-native application portion; a native kernel bridge service interfaced with the native kernel; a non-native kernel bridge service interfaced with the non-native kernel; wherein the native kernel bridge service and the non-native kernel bridge service are interfaced with each other, and enable the non-native application portion to access the native plugin services of the native kernel, and enable the native application portion to access the non-native plugin services of the non-native kernel.

In one embodiment, the web view context is defined by a native web browser application of the computing device.

In one embodiment, the access to the native plugin services and the non-native plugin services by either of the native application portion or the non-native application portion occurs via a common API.

In one embodiment, the non-native application portion is defined by a model view controller or an application framework.

In one embodiment, one or more of the native plugin services provides access to a native feature of the computing device.

In one embodiment, one or more of the non-native plugin services accesses a cloud-based service.

In one embodiment, one or more of the native plugin services or the non-native plugin services provides a user interface for the hybrid application.

In one embodiment, the hybrid application further includes: a frame context defined within the web view context; a second non-native application portion defined within the frame context; a bridge client defined within the frame context, the bridge client configured to receive an API call from the second non-native application portion for one of the native plugin services or the non-native plugin services, and forward the API call to the non-native bridge service.

In one embodiment, the bridge client is configured to restrict access of the second non-native application portion to a subset of the non-native plugin services of the non-native kernel.

In one embodiment, the bridge client is configured to restrict access of the second non-native application portion to a subset of the native plugin services of the native kernel.

In one embodiment, the second non-native application portion is defined by a model view controller or an application framework.

In one embodiment, the hybrid application further includes: a nested frame context defined within the frame context; a third non-native application portion defined within the nested frame context; a second bridge client defined within the nested frame context, the second bridge client configured to receive an API call from the third non-native application portion for one of the native plugin services or the non-native plugin services, and forward the API call to the bridge client.

In another embodiment, a hybrid application defined on a computing device is defined to include: a native application portion configured for execution in a native environment of the computing device; a native kernel defined in the native environment, the native kernel including one or more native plugin services accessible by the native application portion; a native kernel bridge service defined in the native environment and interfaced with the native kernel; a non-native application portion defined in a first web view context of the computing device; a non-native kernel defined in a second web view context of the computing device, the non-native kernel including one or more non-native plugin services accessible by the non-native application portion; a non-native kernel bridge service defined in the second web view context and interfaced with the non-native kernel; wherein the native kernel bridge service and the non-native kernel bridge service are interfaced with each other, and enable the non-native application portion to access the native plugin services of the native kernel, and enable the native application portion to access the non-native plugin services of the non-native kernel.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe systems and methods for hybrid applications. It will be obvious, however, to one skilled in the art, that the present invention may be practiced without some or all of these specific details. In other instances, well known process operations have not been described in detail in order not to unnecessarily obscure the present invention.

Figure 1:
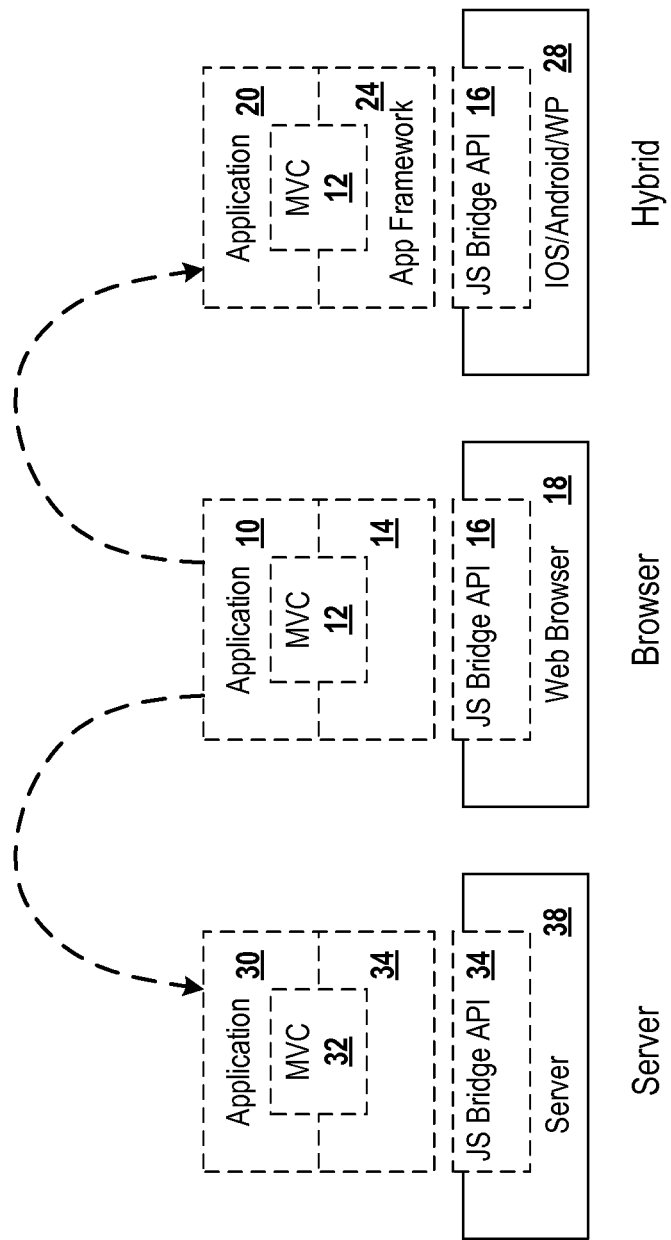
FIG. 1 conceptually illustrates a cross-platform application development model, in accordance with embodiments of the invention.

FIG. 1 conceptually illustrates a cross-platform application development model, in accordance with embodiments of the invention. Embodiments of the invention provide for a pluggable platform for HTML (e.g. HTML5), JS and CSS based application development, providing a consistent API across server, browser and hybrid runtimes. In the illustrated embodiment, the application 10 can be developed using standard web technologies, such as HTML, JS and CSS. The application 10 may leverage a model-view-controller (MVC) 14 (e.g. Mojito, etc.) built on an application framework 14 (e.g. YUI, etc.). A JS bridge API 16 provides a consistent API to enable calls from the web application, with possible subframes, to various services 18 which are implemented differently on each native platform the application runs 18, 28, and 38.

The embodiments of the invention provide developers the ability to write an application once using web technologies such as HTML, CSS3 and JavaScript and simultaneously deploy that application to multiple environments, such as a web server, Android, iOS, Windows Desktop, Mac OS X Desktop, plus other platforms in the future. In the illustrated embodiment, an application 20 is the same as or substantially similar to application 10, but deployed utilizing a MVC 22, application framework 24, and JS Bridge API 26 in a mobile operating system (OS) environment 28. Similarly, an application 30 is the same as or substantially similar to application 10, but deployed utilizing a MVC 32, application framework 34, and JS Bridge API 36 in a server environment 38. The deployed applications can run in a web browser, while leveraging native platform capabilities such as camera, accelerometer, etc. Embodiments of the invention provide for a library of modular services with well documented APIs callable by JavaScript and native code that perform many complex and/or common features such as the following: login, analytics, automatic package updates, database queries (e.g. SQL, YQL), push notifications, 2-way data sync and offline caching, etc.

Because it is not necessary to rewrite the application from scratch for deployment across different operating environments, developers can spend less time creating platform-centric solutions for basic functionality, and focus more on other areas, such as designing differentiating features for a given platform. Since services' APIs are available for native code, developers can selectively blend platform specific features with their core HTML based experience. Examples of such platform-specific features include the following: Siri voice recognition for iOS devices, OpenGL graphics, augmented reality UI on mobile devices, etc.

Although applications can be written against a common API, it may not always be possible for the APIs to invoke their implementations directly. For example, in a hybrid native/web view environment, JS API calls may need to be "bridged" out to a native implementation. Even in pure desktop browser environments, JS API calls may need to be bridged from multiple iframes to a common implementation. For example, it may be the case that an advertisement should not be able to invoke login APIs nor should an RSS referenced external website be able to invoke arbitrary calls. At the same time, it is desirable for efficiency that simple applications that don't need this level of sophistication should not be saddled with unnecessary overhead.

Figure 2:
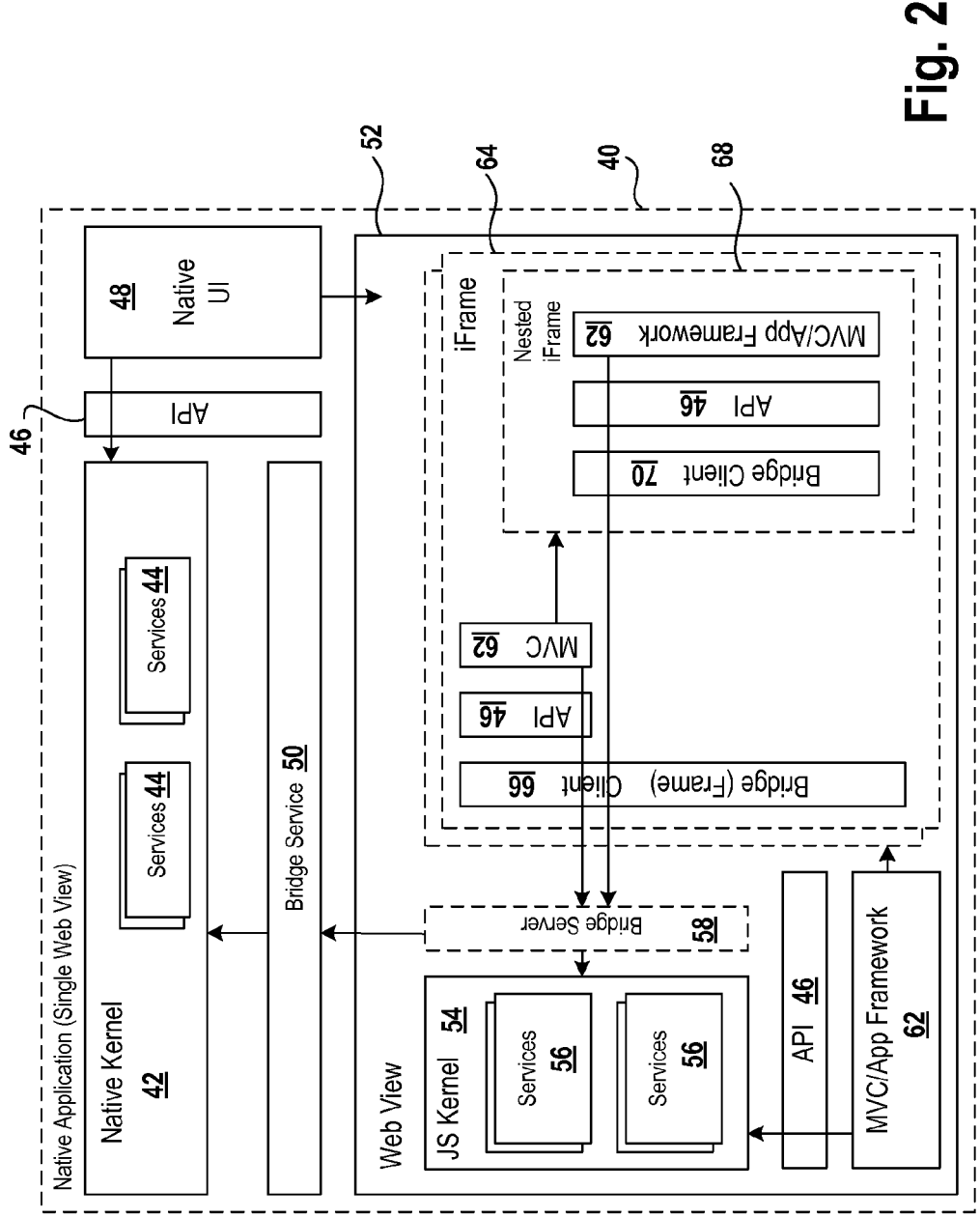
FIG. 2 illustrates a single web view application architecture, in accordance with an embodiment of the invention.
Figure 3:
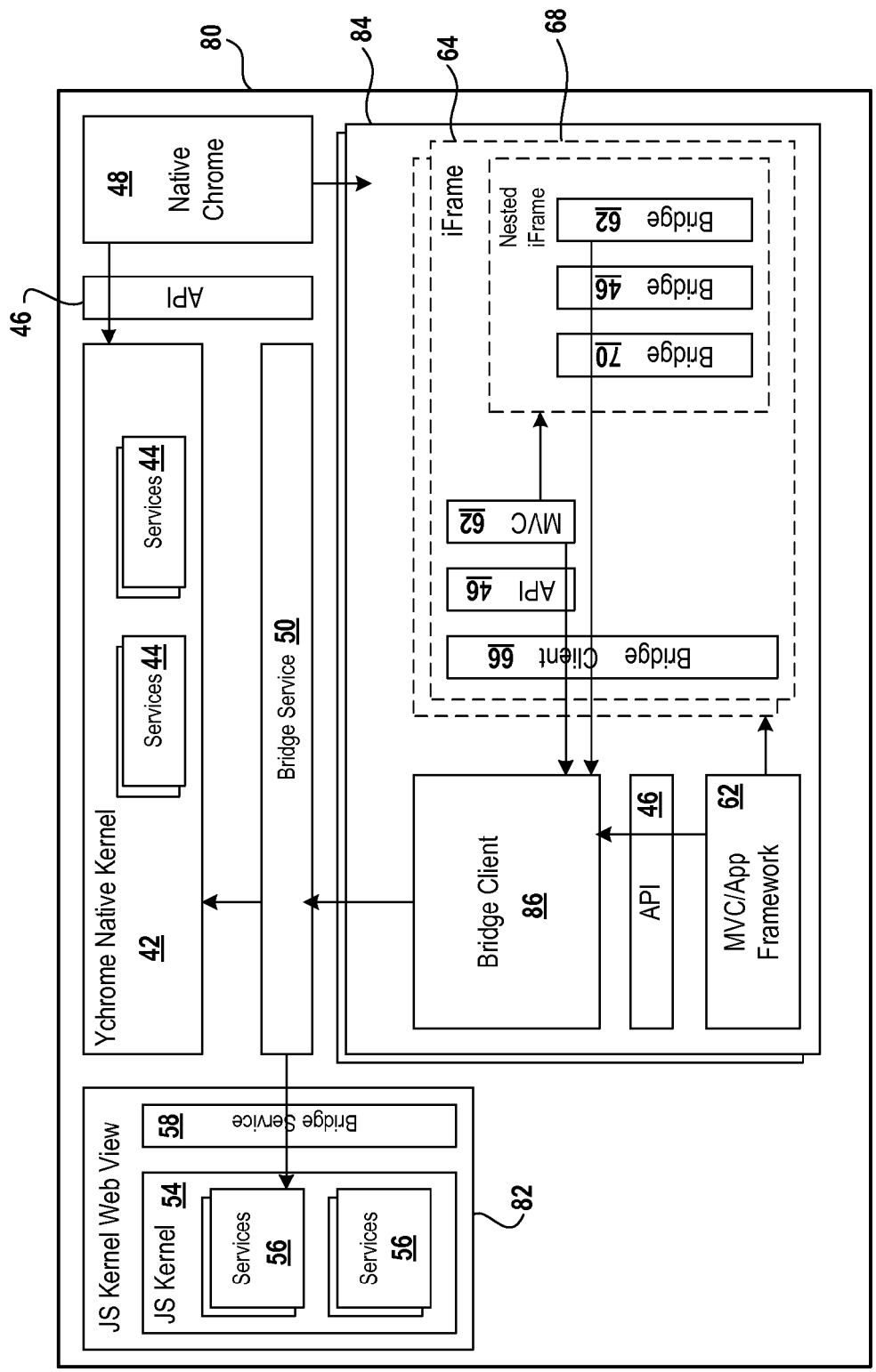
FIG. 3 illustrates a multi web view application architecture, in accordance with an embodiment of the invention.

With reference to FIGS. 2 and 3, a bridge remote procedure call (RPC) architecture is disclosed which can scale up to support sophisticated applications that require multiple hybrid native-HTML5 web views or iframes for security and memory requirements. The architecture can also be scaled down to the level of a single screen utility application running in a web browser. This means that application code executing in the same context (iframe, address space, non-iframed web view, etc. . . . ) is able to directly invoke service code with minimal overhead. Additional complexity is only enabled or layered on top when the first sub-context (iframe, web view, etc. . . . ) is created.

For purposes of the present disclosure, a bridge can broadly be defined as an RPC mechanism for communicating between execution contexts such as iframes, web views, etc. Based on a standard Bridge Primitives API, different mechanisms may be utilized to cross different types of context boundaries.

Common UI elements or behaviors may be shared by different parts of the same application. Collectively, these may define the "chrome" of an application. Common UI elements can be navigation-specific such as a tab bar or a "back" button. Another example of a chrome element is an application-wide utility UI such as the ability to bookmark the current page or take a picture.

There may be various contexts, including, but not limited to, iframes, web views, native execution environments, address spaces, interpreter VM instances or networked processing nodes. Code running in a first context normally cannot directly invoke code in a second context. However, a special bridge RPC mechanism is provided to securely facilitate such communication. Contexts are advantageous from both a security and memory management perspective. For example, one may not want untrusted or semi-trusted code to have unlimited access to all available APIs. Embedded devices such as tablets and phones may not have enough RAM to support a large application. Therefore, it may be advantageous to separate an application into modules that can be loaded, saved, destroyed and reloaded to prevent exhausting system memory. In view of these concerns, contexts can be configured to provide strong guarantees that unauthorized API calls are blocked and memory is reclaimed when a context is destroyed.

A service is broadly defined as a singleton plug-in module implementing functionality shared between contexts. Examples of services include a package service, YQL caching service, login service, etc. Each service publishes a set of public APIs that can be invoked from any context (subject to access control restrictions). As has been noted, some APIs may be blocked from being called by certain contexts for reasons such as security and privacy.

The RPC primitives defined by this architecture can support cross-context communications such as iframe to iframe communications and JS to native communications. The architecture can be implemented in different environments (e.g. iOS, Android, Desktop Browser, etc.) and allow them to cross-communicate with each other.

For example, in a hybrid application environment, the bridge is designed to facilitate JS-native intercommunication. Part of the application can be written in native code while the other part is written in HTML5 using JavaScript. This type of bridge uses special mechanisms depending on the native execution environment.

The structure of hybrid applications can also be emulated in a single desktop web browser through the use of iframes. Since communications between iframes is restricted, a special bridging solution is provided for cross-iframe communications. For example, an RSS reader application may be enabled to open external websites while using application specific chrome to position and dismiss it. Another possibility is a 3rd party advertisement that can make API calls but is placed into an iframe to limit access to the surrounding application and certain APIs.

The bridge RPC architecture can support more than one sub-contexts as well as nested sub-contexts. For example, a JS-Native bridge may support multiple JS contexts and not assume that there is only one web view for the entire app. Bridged iframes can be enabled to spawn additional bridged sub-iframes (subject to any security restrictions).

The bridge RPC architecture can be provided with security mechanisms, especially when sub-contexts are created. For example, a parent context may be able to restrict the APIs (services & methods) that a child context can invoke. Child contexts may be defined to not be able to circumvent these security measures.

FIG. 2 illustrates a single web view application architecture, in accordance with an embodiment of the invention.

Broadly speaking, an application can be defined to include a root object that is referred to as a "kernel." As with an operating system kernel, the application's kernel is responsible for booting-up the application and providing basic system services. An application may define a single kernel for each unique execution environment. For example, a pure desktop browser application may have just a single JavaScript kernel. Whereas, a hybrid native-HTML5 application may have a JavaScript kernel and a native kernel. When there are multiple kernels, they may be arranged in a hierarchy, with a master kernel (usually the native kernel) spawning other kernels.

In the illustrated embodiment, the application 40 is defined to include a native kernel 42 and a JavaScript kernel 54. The two kernel instances coordinate over a bridge so as to act as a single unified kernel. A hybrid native-HTML5 application with multiple web views still has a single JavaScript kernel, but it may be configured to run in its own dedicated web view, as described further below.

As with kernel extensions in a desktop OS, there are services defined which provide common services to a set of environments/contexts, such as iframes, web views, etc. Services are allowed to look-up and invoke other services, including ones running in a different kernel. In the illustrated embodiment, the native kernel 42 includes services 44, while the JS kernel 54 includes services 56. Each of the services 44 and 56 may look-up and invoke other services. Application developers can omit unused services as well as create their own special services.

To optimize service calls from the chrome, each of the kernels provides privileged APIs for invoking its services. In the illustrated embodiment, the services of the native kernel 42 and the JS kernel 54 collectively publish an API 46, according to which the services may be called. For example, the native UI 48 in the native context or the MVC 62 (or application framework) in the web view 52 context may call the services of either kernel via the API 46. A special kernel bridge service extends the service call mechanism to sub-contexts and other "remote" kernels. The bridge service is a special service that is responsible for managing communications with sub-contexts and synchronizing calls between multiple kernels. Each kernel usually has a bridge but as with any other service, it can be omitted if there is only a single kernel and nested sub-context support isn't required. As shown, the native kernel 42 has an associated bridge service 50, and the JS kernel 54 has an associated bridge service 58.

As the native UI 48 is part of the native environment, it may directly invoke the services 44 of the native kernel 42 via the API 46. However, when the native UI 48 issues a call for one of the services 56 of the JS kernel 54, then the native kernel 42 passes the call to its associated bridge service 50. The bridge service 50 builds the call into an RPC message (e.g. JSON object), including source and destination identifiers. The message is passed from the bridge service 50 to the bridge service 58 associated with the JS kernel 54, which reads the message as destined for the JS kernel 54, and therefore passes its API call to the JS kernel 54, which accesses the appropriate service based on the API call. In this manner, the native UI 48 in the native context is able to access services of the JS kernel 54 in the web view context 52.

In a similar manner, as the MVC 62 (or application framework) is implemented as part of the web view context 52, it may directly access the services 56 of the JS kernel 54 via the API 46. However, when the MVC 62 calls one of the services 44 of the native kernel 42, then the API call, which cannot be services by JS kernel 54, is passed to the bridge service 58, which builds an RPC message based on the API call, and forwards the message to the bridge service 50 associated with the native kernel 42. The bridge service 50 in turn passes the API call to the native kernel 42, to access the appropriate one of the services 44. Accordingly, the MVC 62 in the web view context 52 is able to access the services 44 of the native kernel.

In addition to various contexts such as the native context and the web view context, there may be sub-contexts, such as iframes or even nested iframes. In the illustrated embodiment, an iframe 64 is shown, along with a nested iframe 68 within the iframe 64.

A specialized bridge instance or bridge client runs in every sub-context. Its job is to forward bridge calls to its parent bridge, enforcing access control restrictions along the way. In the illustrated embodiment, the iframe 64 includes a bridge client 66, and the nested iframe 68 includes a bridge client 70.

Bridge calls can be made from code executing in the context or forwarded-up from sub-contexts. When a callback is invoked, the bridge client is responsible for invoking registered callbacks routing the callback to registered sub-contexts. The outermost bridge client forwards calls to the nearest kernel bridge service for processing. When a sub-context is terminated, the bridge client is configured to clean-up open objects, outstanding callbacks, methods and finally deregister the sub-context's ID.

By way of example, API calls from the MVC 62 of the iframe 64 are packaged by the bridge client 66 into an RPC message and passed to the bridge service 58. The bridge service 58 reads the destination of the message, and depending on its destination (JS kernel or native kernel), either forwards the API call to the JS kernel 54 to invoke one of the services 56, or forwards the message to the bridge service 50, which in turn forwards the API call to the native kernel 42 to invoke one of the services 44.

Likewise, an API call originating from the nested iframe 68 is packaged by its bridge client 70 into an RPC message. The message is forwarded to the bridge client 66 of the iframe 64, which in turn forwards it to the bridge service 58 of the web view 52. If the message is destined for the JS kernel 54 then its API call is passed to the JS kernel 54 to invoke one of the services 56. Whereas if the message is destined for the native kernel 42, then it is passed to the bridge service 50 of the native context, which in turn passes the API call to the native kernel 42 to invoke one of the services 44.

Thus, it can be seen that the services 44 and the services 56 are accessible from any context of the application architecture, including a native context, a web view context, an iframe context, and a nested iframe context. Accordingly, API calls to the native kernel from HTML are enabled, as are API calls from the native UI to JavaScript services in the JS kernel. This is facilitated by the common API 46, which can be restricted for a given context to limit the accessibility of certain services from the given context. For example, API access from the iframe 64 can be restricted in some manner, so that certain services are not accessible from the iframe 64. The bridge client 66 can be configured to enforce the restriction by not permitting API calls for those services to be passed to the bridge service 58. API access from the nested iframe 68 would be subject to at least the same restrictions as its parent iframe 64, and could be further restricted if desired, with the further restriction being enforced by the bridge client 70.

FIG. 3 illustrates a multi web view application architecture, in accordance with an embodiment of the invention. The illustrated application 80 differs from the previously described application 40 primarily in that the JS kernel 54 and its associated bridge service 58 are provided in their own dedicated web view 82. The web view 82 draws no pixels on-screen, but is instead instantiated to support the JS kernel 54. Additional web views, such as web view 84, can be defined in addition to the JS kernel web view 82, and may include an iframe 64 and nested iframe 68. API calls from the web view 84 (including those from sub-contexts such as iframe 64 or nested iframe 68) are received by the bridge client 86, and passed to the bridge service 50. If the API call is for one of the services 44 of the native kernel 42, then it is forwarded to the native kernel 42 for processing. Whereas if the API call is for one of the service 56 of the JS kernel 54, then it is forwarded to the bridge service 58, which will in turn forward it to the JS kernel 54.

In the case of an application architecture employing a single web view, if the web view is reloaded, then the existing JS kernel in the web view is destroyed and then reloaded again, which is a time-consuming process. Furthermore, when one web view reloads, there is a moment during reloading when the old and new web views exist simultaneously in memory, which utilizes a large amount of memory and may risk automatic termination of the application by the operating system due to low memory. However, when the JS kernel 54 is provided in its own dedicated JS kernel web view 82, additional web views can be created, destroyed, or reloaded without affecting the continuity of the JS kernel 54, thus improving efficiency. Furthermore, to avoid memory overuse during reloading, the system can be configured to capture and display a screenshot of the first web view, then kill the first web view, release the memory, and then load the next web view. In this manner, old and new web views do not simultaneously occupy memory resources. Additionally, because the JS kernel can survive across web views, it can perform services (e.g. downloading data) independent of web views, and may enable communication between different web views.

According to embodiments described herein a plug-in framework is provided for reusable platform components (services). The provision of services frees application developers from re-inventing the same complex and/or mundane subsystems for each application they write. Services may fall into one or more of various categories, including the following: Resource Manager/Broker (Accelerometer, Busy Status, Compass, Camera, Free Memory Monitoring, GPS); Cloud Service Proxy (Advertisements, Analytics, Package Deployment, Login, Push Notification, Social, User Preferences, YQL); UI Chrome/Navigation (Interface w/Chrome, Coordinate w/UI Transitions, Modal UI); Security/Runtime Infrastructure (Local User Profiles, Expiry, Hybrid Bridging, Inter-Context Communications, Testing).

In one embodiment, resource manager/broker services may follow a simple resource manager pattern. The corresponding APIs gracefully degrade if the service is not available in a particular runtime. API calls fail with a known error, and it is possible to query for the service's availability before trying to use it. A resource manager brokers shared access to a single/limited resource. This involves tracking/scheduling multiple (sometimes conflicting) requests to a single resource. For example, a GPS service may receive the following simultaneous requests: (1) Enable the GPS and provide a location every 1 second; (2) Enable the GPS and provide a location every minute. The service would enable the GPS and configure it to report every 1 second. But in order to satisfy the second request, it would only send back every 60th GPS position. If the first request is terminated, the service would reconfigure the GPS to report every 60 seconds to conserve power.

Resources may or may not correspond to physical hardware. They can be abstract such as whether the runtime is globally busy. The nature of the busy status can be used as a powerful hint for regulating the runtime. For example, it could be used to display/hide a busy indicator, block user input or suspend/resume background operations. Again, the service may deal with potentially conflicting requests from independent clients: (1) Busy, block user input, show busy indicator; (2) Busy, don't block user input, hide busy indicator; (3) Busy, realtime—suspend background operations. One possible way to resolve these conflicting status would have blocking user input and hiding the busy indicator take precedence: Busy, block user input, hide busy indicator, suspend background operations.

In one embodiment, proxy services provide an API abstraction that maps to REST APIs provided by a cloud service.

For example, an analytics service API may map to a cloud-based analytics service, to perform functions such as formatting and sending beacons, and storing and forwarding beacons when offline. A YQL/SQL service API may map to a cloud-based YQL/SQL database, to perform functions such as parsing YQL/SQL protocol, or caching YQL/SQL results in a local SQLite cache, or incrementally downloading records (e.g. titles now, body later). A login service API may map to a cloud-based token authentication or OpenId service, to perform functions such as basic login protocol, handle CAPTCHA, sign-up, etc. A preferences service API may map to a cloud-based UDB or UPS, to, for example, get/set user preferences, cache local preferences when offline and synchronize, etc. A package service API may map to a cloud-based package management service, to, e.g., act as a pass-thru to a web file server, perform atomic distribution of new client code, compute dependencies of dynamically added packages.

In the basic case, the service should at least take care of the network protocol parsing. In more advanced implementations, the same services could offer offline caching, batched network optimizations or hooks for custom UI on a traditionally web-based flow such as login. These services place powerful cloud resources at every developer's fingertips. A single application can simultaneously target web sites, mobile devices, desktops and television. Complex but highly reusable functions such as data synchronization, application deployment and security are written once and centrally maintained. Application developers are free to focus on product features instead of re-inventing basic functionality. Developing such services may be end-to-end projects, involving backend, server middleware, chrome UI (JS, iOS, Android, etc. ... ). Complexity can range from simple integration (e.g. login) to entire new backend subsystems like mobile package update distribution.

In some embodiments, services provide UI chrome/navigation features. Common services generally do not dictate a particular UI look & feel (buttons, toolbars, navigation, etc. ... ). However, services can also let application developers apply their own custom chrome/window manager/ "look & feel." A default UI service abstract base class can provide a place for developers to instantiate their own UI. It is usually the last service to be initialized. During its initialization, it is free to instantiate UI elements. UI service subclasses can also add new methods for interacting with the custom UI chrome.

A native UI service implementation could use the native UI toolkit to create a native chrome. Eventually it can instantiate one or more special web view object(s) where the HTML5 portion(s) of the application will execute. Complex hybrid HTML5/native animations can be coordinated via special chrome specific UI service method calls.

A JavaScript UI service implementation can use iframes and DOM manipulations for a similar effect. When designing custom chrome, the application developer is responsible for designing a consistent UI service subclass API that works across the supported platforms. They are also responsible for porting the chrome implementation between supported platforms. A well-executed porting will provide a unified look & feel to the application.

The UI service is not the only place user interfaces can be implemented. Many platforms offer standard UIs for taking a photo or composing an e-mail, for example. Separate services can provide access to these standard modal UI regardless of UI service implementation.

The UI service also plays an important role as a window manager. Sophisticated user interfaces can consume large amounts of memory. Therefore, a successful UI service should monitor memory usage (e.g. via communication with a memory service) and gracefully degrade the user experience if memory starts to run low. This could mean destroying hidden iframes/web views, delaying the creation of new iframes/web views or switching to a lighter skin. Failure to properly manage memory can lead to the application crashing due to low memory.

Security/Runtime infrastructure services provide for a safe and powerful environment for applications to run. One example of an infrastructure service is the kernel bridge service which allows native services to be invoked from JavaScript code, and allows JavaScript services to be invoked from native code. The bridge lives in a service because it is optional for pure browser applications that don't require sub-iframe support. In some embodiments, special bridge specific kernel hooks are kept to a minimum. The bridge service has the highest privilege level to call any method (public or private) in any active service. Therefore, the bridge service can act in a defensive capacity, protecting the kernel and services from malicious RPC calls.

Another example of a security related service is an account service which manages separate user home directories/sandboxes. An account service can ensure that a user's cookies and data are kept separate from other users sharing the same app.

Embodiments of the invention provide a platform for plug-in services which enable high quality applications to be developed which seamlessly blend native code and HTML. (For iOS, native code is Objective C; for Android, native code is Java; for Windows Phone, native code is C#; etc.) As it can be very tedious to write high quality native applications, and rewrite them again for different platforms with different languages, portions of an application can instead be written in HTML/JavaScript, which is immediately usable in all web browsers, and can be used across iOS, Android, Windows Phone, and other operating systems. Certain types of content functionality, such as graphics, layouts, and web page related content, are generally easier done in HTML than in native code. In accordance with embodiments of the invention, a set of APIs for accessing native functionality can enable the HTML portion of the application to go beyond what HTML could normally do. In this type of application paradigm, the majority of an application's functionality could be written once in HTML/JavaScript, with differentiating features based on the platform that it happens to be running on provided by way of APIs that reach out to native functionality. Additionally, the APIs would also allow a native portion of the application to access JavaScript services, so that these services can be reused across platforms and integrated with native functionality.

Thus, it is possible to support a special feature that may only be available on a specific platform. The special feature would be enabled when the HTML portion of the application is determined to be running in the specific platform environment (e.g. iOS, Android, Windows Phone, etc.). Whereas if the same HTML portion of the application is not running in the specific platform environment, then the special feature would not be presented to the user.

Furthermore, the HTML portion could be updated without requiring the user to download an entirely new application (e.g. could update look and feel of user interface), as the native portion of the application stays the same.

In accordance with embodiments described herein, a plugin framework is provided for developers to write plugins that offer these APIs. In practice, developers for different platforms would define a common API that can be implemented across platforms, and which do not use any special features unique to a specific platform. Then each of the various platform specific implementations would be configured to operate with the common API.

The API can be defined by an interface description language (IDL) defining the name of the service, its functions, parameters, callbacks, etc. In one embodiment, a validator validates an API call based on the IDL. The IDL may adhere to certain styles of APIs. For example, APIs are callback-based, not synchronous; parameters are JSONable entities, strings, arrays, or numbers, but not something else; e.g. cannot be complex JavaScript objects.

The platform may support 3rd party development and publishing of APIs. In this case, the third party would ensure conformance to the IDL, and would be responsible for enforcing their API.

Embodiments of the invention herein described may utilize relational database systems as are known in the art. Examples of such database systems include MySQL, Oracle, and Access. Various operations as described above may be affected by performance of an operation via a relational database management system. Such database systems may be embodied in one or more server computers, which may be configured as part of a network of computers.

Figure 4:
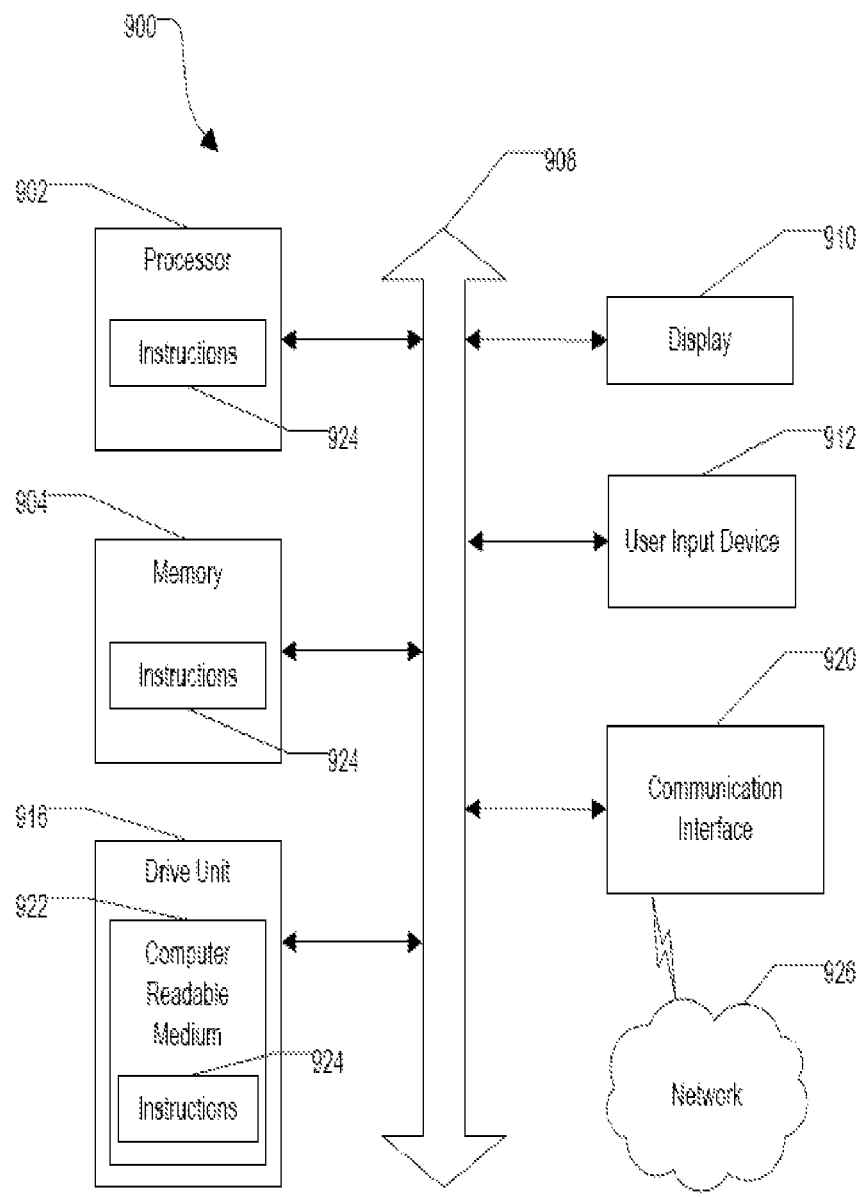
FIG. 4 illustrates an embodiment of a general computer system

FIG. 4 illustrates an embodiment of a general computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 4, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 904 includes a cache or random access memory for the processor 902. In alternative embodiments, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 916.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the computer system 900.

The computer system 900 may also or alternatively include a disk or optical drive unit 916. The disk drive unit 916 may include a computer-readable medium 922 in which one or more sets of instructions 924, e.g. software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 926 can communicate voice, video, audio, images or any other data over the network 926. Further, the instructions 924 may be transmitted or received over the network 926 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 926, external media, the display 910, or any other components in system 900, or combinations thereof. The connection with the network 926 may be a physical connection, such as a wired Ethernet connection or may be established wirelessly as discussed below. Likewise, the additional connections with other components of the system 900 may be physical connections or may be established wirelessly. The network 926 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 926. The network 926 may be the same as, similar to, and/or in communication with networks 130 and/or 135. Any of networks 130, 135, and 926 may be wired or wireless. The wireless network may be a cellular telephone network, an 802.11, 802.16, 802.20, or WiMax network. Further, the networks 130, 135, and 926 may be a public network, such as the Internet, a private network, such as an intranet, or combinations thereof, and may utilize a variety of networking protocols now available or later developed including, but not limited to TCP/IP based networking protocols. The networks 130, 135, and 926 may include wide area networks (WAN), such as the Internet, local area networks (LAN), campus area networks, metropolitan area networks, a direct connection such as through a Universal Serial Bus (USB) port, or any other networks that may allow for data communication. The networks 130, 135, and 926 may be configured to couple one computing device to another computing device to enable communication of data between the devices. The networks 130, 135, and 926 may generally be enabled to employ any form of machine-readable media for communicating information from one device to another. The networks 130, 135, and 926 may include communication methods by which information may travel between computing devices. The network 130 may include the Internet and may include all or part of network 135; network 135 may include all or part of network 130. The networks 130, 135, and 926 may be divided into sub-networks. The sub-networks may allow access to all of the other components connected to the networks 130, 135 in the system 100, or the sub-networks may restrict access between the components connected to the networks 130, 135. The networks 130, 135, and 926 may be regarded as a public or private network connection and may include, for example, a virtual private network or an encryption or other security mechanism employed over the public Internet, or the like.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A hybrid application configured for execution by a processor of a computing device, comprising:
    a native application portion configured for execution in a native environment of the computing device;

a native kernel defined in the native environment, the native kernel including one or more native plugin services accessible by the native application portion;
a non-native application portion configured for execution in a web view context of the computing device;
a non-native kernel defined in the web view context, the non-native kernel including one or more non-native plugin services accessible by the non-native application portion;
a native kernel bridge service interfaced with the native kernel;
a non-native kernel bridge service interfaced with the non-native kernel;
wherein the native kernel bridge service and the non-native kernel bridge service are interfaced with each other, and enable the non-native application portion to access the native plugin services of the native kernel, and enable the native application portion to access the non-native plugin services of the non-native kernel;
wherein one or more of the native plugin services or the non-native plugin services provides a user interface for the hybrid application.

2. The hybrid application of claim 1, wherein the web view context is defined by a native web browser application of the computing device.

3. The hybrid application of claim 1, wherein the access to the native plugin services and the non-native plugin services by either of the native application portion or the non-native application portion occurs via a common API.

4. The hybrid application of claim 1, wherein the non-native application portion is defined by a model view controller or an application framework.

5. The hybrid application of claim 1, wherein one or more of the native plugin services provides access to a native feature of the computing device.

6. The hybrid application of claim 1, wherein one or more of the non-native plugin services accesses a cloud-based service.

7. A hybrid application configured for execution by a processor of a computing device, comprising:
a native application portion configured for execution in a native environment of the computing device;
a native kernel defined in the native environment, the native kernel including one or more native plugin services accessible by the native application portion;
a non-native application portion configured for execution in a web view context of the computing device;
a non-native kernel defined in the web view context, the non-native kernel including one or more non-native plugin services accessible by the non-native application portion;
a native kernel bridge service interfaced with the native kernel;
a non-native kernel bridge service interfaced with the non-native kernel;
wherein the native kernel bridge service and the non-native kernel bridge service are interfaced with each other, and enable the non-native application portion to access the native plugin services of the native kernel, and enable the native application portion to access the non-native plugin services of the non-native kernel;
a frame context defined within the web view context;
a second non-native application portion defined within the frame context;
a bridge client defined within the frame context, the bridge client configured to receive an API call from the second non-native application portion for one of the native plugin services or the non-native plugin services, and forward the API call to the non-native bridge service.

8. The hybrid application of claim 7, wherein the bridge client is configured to restrict access of the second non-native application portion to a subset of the non-native plugin services of the non-native kernel.

9. The hybrid application of claim 7, wherein the bridge client is configured to restrict access of the second non-native application portion to a subset of the native plugin services of the native kernel.

10. The hybrid application of claim 7, wherein the second non-native application portion is defined by a model view controller or an application framework.

11. The hybrid application of claim 7, further comprising,
a nested frame context defined within the frame context;
a third non-native application portion defined within the nested frame context;
a second bridge client defined within the nested frame context, the second bridge client configured to receive an API call from the third non-native application portion for one of the native plugin services or the non-native plugin services, and forward the API call to the bridge client.

12. A hybrid application configured for execution by a processor of a computing device, comprising:
a native application portion configured for execution in a native environment of the computing device;
a native kernel defined in the native environment, the native kernel including one or more native plugin services accessible by the native application portion;
a native kernel bridge service defined in the native environment and interfaced with the native kernel;
a non-native application portion defined in a first web view context of the computing device;
a non-native kernel defined in a second web view context of the computing device, the non-native kernel including one or more non-native plugin services accessible by the non-native application portion;
a non-native kernel bridge service defined in the second web view context and interfaced with the non-native kernel;
wherein the native kernel bridge service and the non-native kernel bridge service are interfaced with each other, and enable the non-native application portion to access the native plugin services of the native kernel, and enable the native application portion to access the non-native plugin services of the non-native kernel;
a frame context defined within the second web view context;
a second non-native application portion defined within the frame context;
a bridge client defined within the frame context, the bridge client configured to receive an API call from the second non-native application portion for one of the native plugin services or the non-native plugin services, and forward the API call to the non-native bridge service.

13. The hybrid application of claim 12, wherein the web view context is defined by a native web browser application of the computing device.

14. The hybrid application of claim 12, wherein the access to the native plugin services and the non-native plugin services by either of the native application portion or the non-native application portion occurs via a common API.

15. The hybrid application of claim 12, wherein the non-native application portion is defined by a model view controller or an application framework.

16. The hybrid application of claim 12, further comprising,
a nested frame context defined within the frame context;
a third non-native application portion defined within the nested frame context;
a second bridge client defined within the nested frame context, the second bridge client configured to receive an API call from the third non-native application portion for one of the native plugin services or the non-native plugin services, and forward the API call to the bridge client.

* * * * *